(12) United States Patent
Fujita et al.

(10) Patent No.: US 11,511,241 B2
(45) Date of Patent: Nov. 29, 2022

(54) FINE BUBBLE GENERATING METHOD AND FINE BUBBLE GENERATING APPARATUS

(71) Applicant: NANO-SCIENCE LABORATORY CORPORATION, Kyoto (JP)

(72) Inventors: Yuji Fujita, Kyoto (JP); Masafumi Kobayashi, Kyoto (JP); Tsuyoshi Kiriishi, Kyoto (JP)

(73) Assignee: NANO-SCIENCE LABORATORY CORPORATION, Kyoto (JP)

( * ) Notice: Subject to any disclaimer, the term of this patent is extended or adjusted under 35 U.S.C. 154(b) by 497 days.

(21) Appl. No.: 16/616,309

(22) PCT Filed: Dec. 25, 2018

(86) PCT No.: PCT/JP2018/047559
§ 371 (c)(1),
(2) Date: Nov. 22, 2019

(87) PCT Pub. No.: WO2019/138865
PCT Pub. Date: Jul. 18, 2019

(65) Prior Publication Data
US 2020/0238230 A1    Jul. 30, 2020

(51) Int. Cl.
*B01F 23/23* (2022.01)
*B01F 23/231* (2022.01)
*B01F 23/233* (2022.01)

(52) U.S. Cl.
CPC .... *B01F 23/23123* (2022.01); *B01F 23/2312* (2022.01); *B01F 23/2331* (2022.01);
(Continued)

(58) Field of Classification Search
CPC ................ B01F 23/23; B01F 23/2312; B01F 23/23123; B01F 23/2323
See application file for complete search history.

(56) References Cited

U.S. PATENT DOCUMENTS

| 5,316,682 A | 5/1994 | Keyser et al. |
| 2017/0259219 A1 | 9/2017 | Russell et al. |

FOREIGN PATENT DOCUMENTS

| CN | 106732308 A | * | 5/2017 |
| JP | 2003-93858 A | | 4/2003 |

(Continued)

OTHER PUBLICATIONS

Dec. 8, 2020 Office Action issued in Japanese Patent Application No. 2020-503076.
(Continued)

*Primary Examiner* — Robert A Hopkins
(74) *Attorney, Agent, or Firm* — Oliff PLC

(57) ABSTRACT

A fine bubble generating apparatus has a storage tank, a liquid feeding unit suctioning and feeding liquid stored in the storage tank, a gas discharge unit discharging gas into the liquid which is being fed by the liquid feeding unit, and a storage tank. The gas discharge unit includes a gas discharge member with pores having pore diameters of 1.5 μm or less, and a base member having a groove formed in a surface contacting the gas discharge surface of the gas discharge member. The liquid feeding unit moves the liquid along the gas discharge surface of the gas discharge member by causing the liquid to flow in a flow channel enclosed by the gas discharge surface of the gas discharge member and the groove of the base member such that a velocity relative to the gas discharge member is not less than 1 msec.

13 Claims, 7 Drawing Sheets

(52) U.S. Cl.
CPC ............... *B01F 23/231262* (2022.01); *B01F 23/231265* (2022.01); *B01F 2215/0431* (2013.01)

(56) References Cited

FOREIGN PATENT DOCUMENTS

| | | | |
|---|---|---|---|
| JP | 2005-169359 A | | 6/2005 |
| JP | 3158341 U | | 3/2010 |
| JP | 2011-72964 A | | 4/2011 |
| JP | 2018-183709 A | | 11/2018 |
| KR | 2012020775 A | * | 3/2012 |
| WO | 2012/133736 A1 | | 10/2012 |

OTHER PUBLICATIONS

Jun. 15, 2021 Office Action issued in Japanese Patent Application No. 2020-503076.
Mar. 19, 2019 Search Report issued in International Patent Application No. PCT/JP2018/047559.
Mar. 19, 2019 Written Opinion of the International Searching Authority issued in International Patent Application No. PCT/JP2018/047559.

* cited by examiner

FINE BUBBLE GENERATING METHOD AND FINE BUBBLE GENERATING APPARATUS

TECHNICAL FIELD

The present invention relates to a fine bubble generating method and a fine bubble generating apparatus for generating, in liquid, fine bubbles having nano-order diameters.

BACKGROUND ART

A method for generating fine bubbles in liquid is disclosed in, for example, Patent Literature 1. In the fine bubble generating method, a porous body which has multiple gas discharge pores having pore diameters of 5 μm is immersed in liquid stored in a storage tank, and gas is discharged from the porous body, to supply bubbles into the liquid, and vibration having a frequency of 1 kHz or less is applied to the porous body in the direction that is almost perpendicular to the bubble discharging direction while the bubbles are being supplied into the liquid. When the vibration having a frequency of 1 kHz or less is applied to the porous body in the direction that is almost perpendicular to the bubble discharging direction, bubbles discharged from the porous body are made fine by a shear force, to generate fine bubbles in the liquid.

CITATION LIST

Patent Literature

[PTL 1] Japanese Laid-Open Patent Publication No. 2003-93858

SUMMARY OF THE INVENTION

Problems to be Solved by the Invention

However, in the fine bubble generating method disclosed in Patent Literature 1, since the pore diameter of the gas discharge pore of the porous body for supplying bubbles is 5 μm and is relatively large, fine bubbles (microbubbles) having bubble diameters of about a hundred and several tens of μm to about several hundred μm can be generated but fine bubbles having nano-order bubble diameters cannot be generated.

In order to apply, to the porous body, vibration having a frequency of 1 kHz or less in the direction that is almost perpendicular to a bubble discharging direction, a vibrator for which a frequency and an amplitude of vibration to be generated can be optionally set, and a vibration transmission member for transmitting the vibration generated by the vibrator to the porous body immersed in liquid, are necessary. Therefore, a problem arises that a device for performing the fine bubble generating method cannot be made compact and downsized.

An object of the present invention is to provide a fine bubble generating method and a fine bubble generating apparatus capable of efficiently generating, in liquid, fine bubbles having nano-order diameters.

Solution to the Problems

In order to solve the aforementioned problem, the invention of claim 1 is directed to a fine bubble generating method for generating, in liquid, fine bubbles having nano-order diameters, and the fine bubble generating method includes: bringing liquid into contact with a gas discharge surface of a gas discharge member in which multiple gas discharge pores having pore diameters (mode diameter) of 1.5 [μm] or less are opened, and discharging gas into the liquid from the gas discharge member while the liquid is relatively moved along the gas discharge surface of the gas discharge member such that a velocity relative to the gas discharge member is not less than 1 [m/sec].

According to the invention of claim 2, in the fine bubble generating method according to the invention of claim 1, a pore diameter distribution of the gas discharge pores satisfies $(D90-D10)/D50 \leq 3.0$ where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

According to the invention of claim 3, in the fine bubble generating method according to the invention of claim 1 or 2, the gas discharge member is disposed in a flow of the liquid to move the liquid along the gas discharge surface of the gas discharge member.

According to the invention of claim 4, in the fine bubble generating method according to the invention of claim 1 or 2, a flow channel for the liquid is disposed on the gas discharge surface of the gas discharge member in a state where the liquid is in contact with the gas discharge surface, and the liquid is caused to flow in the flow channel and the liquid is thus moved along the gas discharge surface of the gas discharge member.

According to the invention of claim 5, in the fine bubble generating method according to the invention of claim 1 or 2, the gas discharge member has a columnar or a cylindrical shape in which the gas discharge pores are opened in an outer circumferential surface that serves as the gas discharge surface, and the gas discharge member having the columnar or the cylindrical shape is rotated at a fixed position around an axis in a state where the gas discharge member is immersed in stationary liquid.

The invention of claim 6 is directed to a fine bubble generating apparatus for generating, in liquid, fine bubbles having nano-order diameters, and the fine bubble generating apparatus includes: a gas discharge unit having a gas discharge member in which multiple gas discharge pores are opened in a gas discharge surface, and a relative movement unit configured to relatively move liquid along the gas discharge surface of the gas discharge member. The gas discharge member has the gas discharge pores having pore diameters (mode diameter) of 1.5 [μm] or less, and gas is discharged into the liquid from the gas discharge member while the liquid is relatively moved along the gas discharge surface of the gas discharge member by the relative movement unit such that a velocity relative to the gas discharge member is not less than 1 [m/sec].

According to the invention of claim 7, in the fine bubble generating apparatus according to the invention of claim 6, a pore diameter distribution of the gas discharge pores satisfies $(D90-D10)/D50 \leq 3.0$ where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

According to the invention of claim 8, in the fine bubble generating apparatus according to the invention of claim 6 or 7, the gas discharge unit includes a flow channel forming member that has a groove formed in a surface on which the flow channel forming member contacts with the gas discharge surface of the gas discharge member and that is attached so as to be in surface contact with the gas discharge surface of the gas discharge member, and the relative movement unit moves the liquid along the gas discharge surface of the gas discharge member by causing the liquid to flow in a flow channel enclosed by the gas discharge surface of the gas discharge member and the groove of the flow channel forming member.

According to the invention of claim 9, in the fine bubble generating apparatus according to the invention of claim 6 or 7, the gas discharge member has a columnar or a cylindrical shape in which the gas discharge pores are opened in an outer circumferential surface that serves as the gas discharge surface, and the relative movement unit rotates the gas discharge member having the columnar or the cylindrical shape at a fixed position around an axis in a state where the gas discharge member is immersed in stationary liquid.

Advantageous Effects of the Invention

As described above, in the fine bubble generating method according to the invention of claim 1 and the fine bubble generating apparatus according to the invention of claim 6, gas is discharged into liquid from the gas discharge member while the liquid is relatively moved along the gas discharge surface of the gas discharge member such that the relative velocity is not less than 1 [m/sec], so that the gas is discharged into the liquid from the gas discharge pores, of the gas discharge member, having pore diameters (mode diameter) of 1.5 [μm] or less while being divided into fine bubbles having bubble diameters of 1.5 μm or less, and the fine bubbles in the liquid slowly contract to generate nano-order fine bubbles. Therefore, a vibration applying unit, as provided in a conventional art, for vibrating the gas discharge member need not be provided, and the fine bubble generating apparatus can be made compact and downsized.

In the fine bubble generating method according to the invention of claim 2 and the fine bubble generating apparatus according to the invention of claim 7, the pore diameter distribution of the gas discharge pores satisfies (D90−D10)/D50≤3.0 where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores, and, therefore, variation in pore diameter is small. Thus, a large number of nano-order fine bubbles in which variation in bubble diameter is small can be generated.

In order to relatively move the liquid along the gas discharge surface of the gas discharge member, the gas discharge member may be disposed in liquid flow to move the liquid along the gas discharge surface of the gas discharge member as in the fine bubble generating method according to the invention of claim 3, a flow channel for liquid may be disposed on the gas discharge surface of the gas discharge member in a state where the liquid is in contact with the gas discharge surface to cause the liquid to flow in the flow channel, thereby moving the liquid along the gas discharge surface of the gas discharge member as in the fine bubble generating method according to the invention of claim 4, or the columnar or the cylindrical gas discharge member in which the gas discharge pores are opened in the outer circumferential surface that serves as the gas discharge surface may be rotated at a fixed position around an axis in a state of being immersed in stationary liquid as in the fine bubble generating method according to the invention of claim 5 and the fine bubble generating apparatus according to the invention of claim 9.

In particular, as in the fine bubble generating apparatus according to the invention of claim 8, in order to provide the flow channel for liquid on the gas discharge surface of the gas discharge member in a state where the liquid is in contact with the gas discharge surface, the flow channel forming member having a groove formed in a surface on which the flow channel forming member contacts with the gas discharge surface of the gas discharge member is attached to a gas discharge member in a state where the flow channel forming member is in surface contact with the gas discharge surface of the gas discharge member, whereby a portion closed by the gas discharge surface of the gas discharge member and the groove of the flow channel forming member may be used as the flow channel.

DESCRIPTION OF EMBODIMENTS

Figure 1:
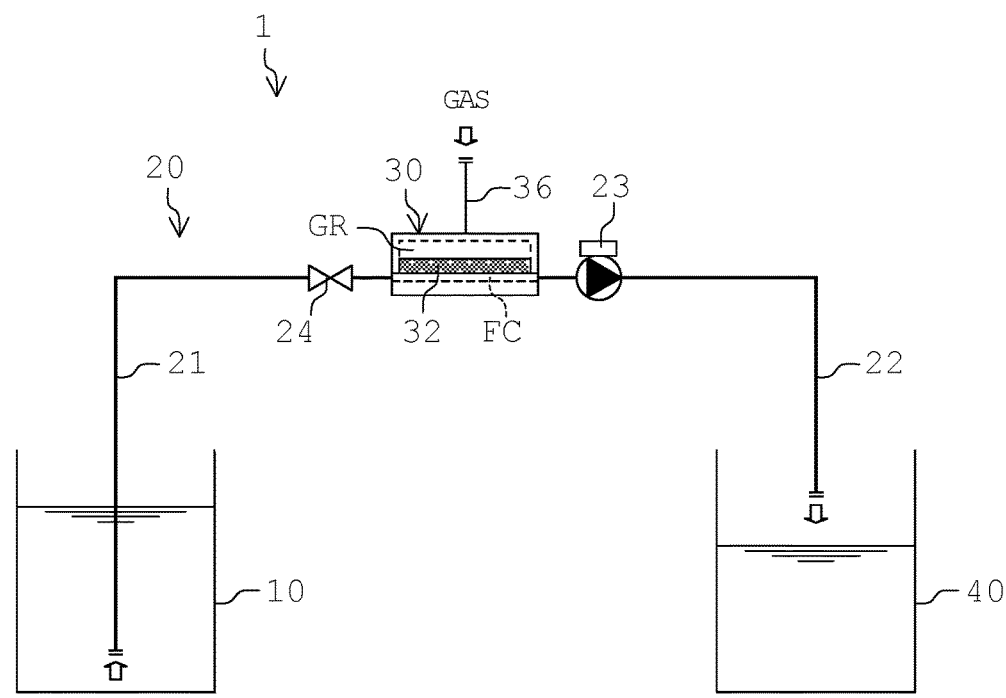
FIG. 1 is a schematic diagram illustrating a configuration of a fine bubble generating apparatus according to one embodiment of the present invention.
Figure 2:
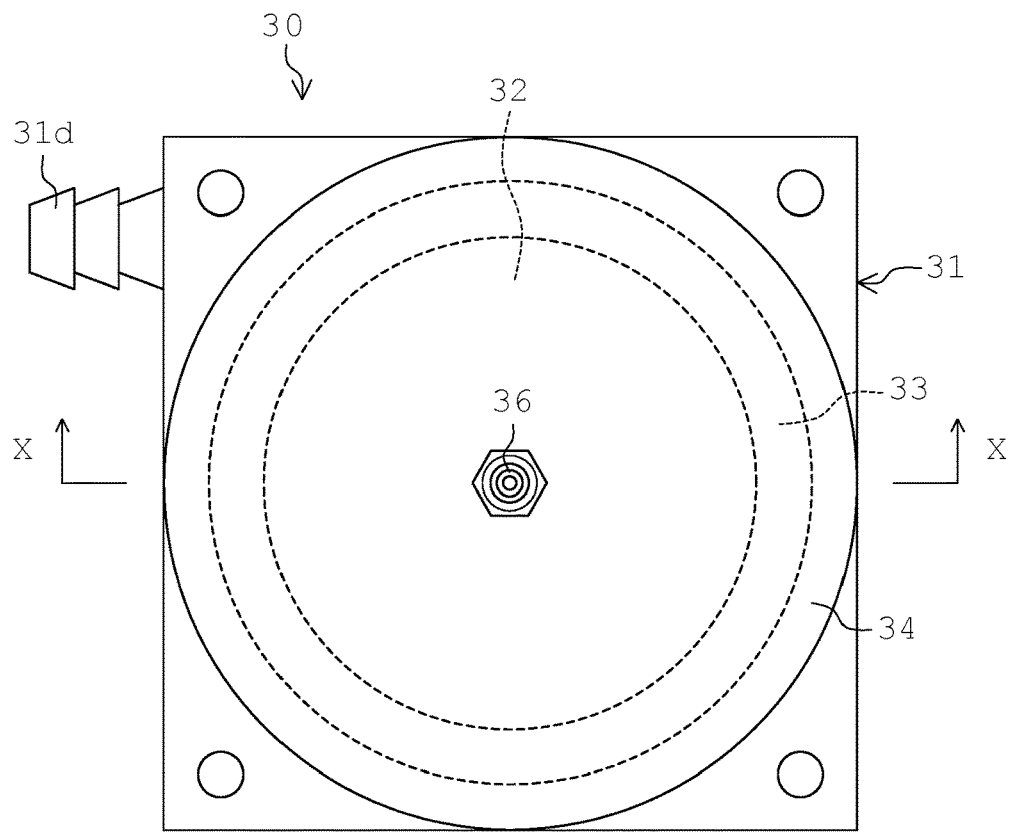
FIG. 2 is a plan view of a gas discharge unit mounted to the fine bubble generating apparatus.
Figure 3:
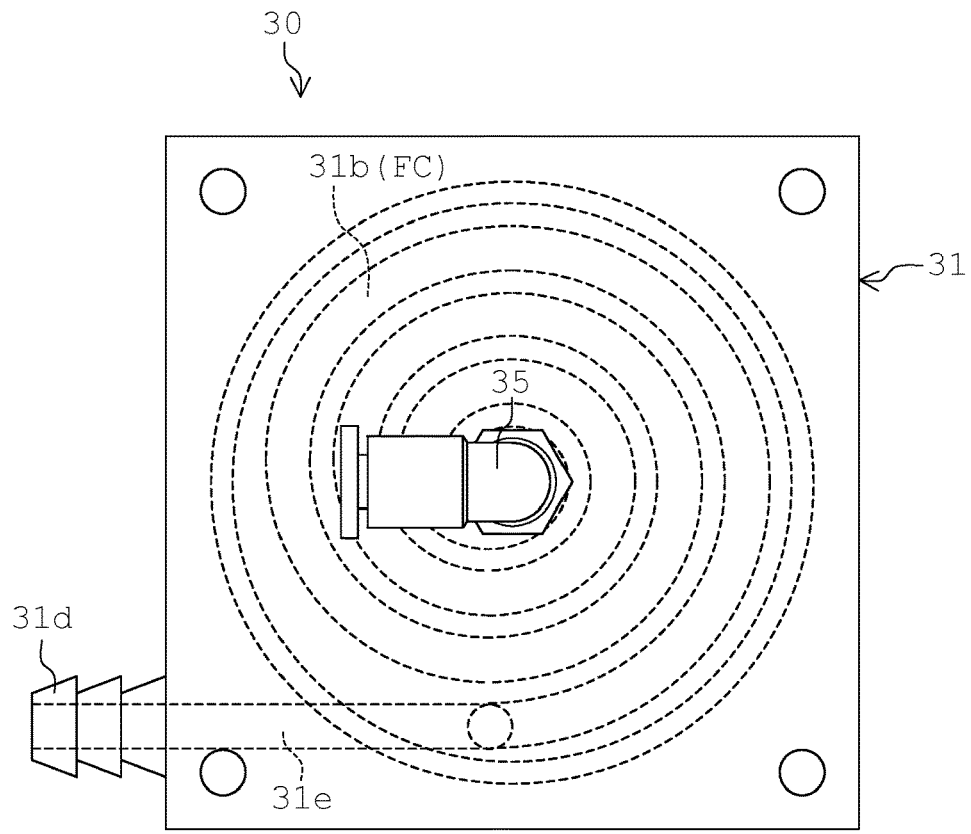
FIG. 3 is a bottom view of the gas discharge unit.
Figure 4:
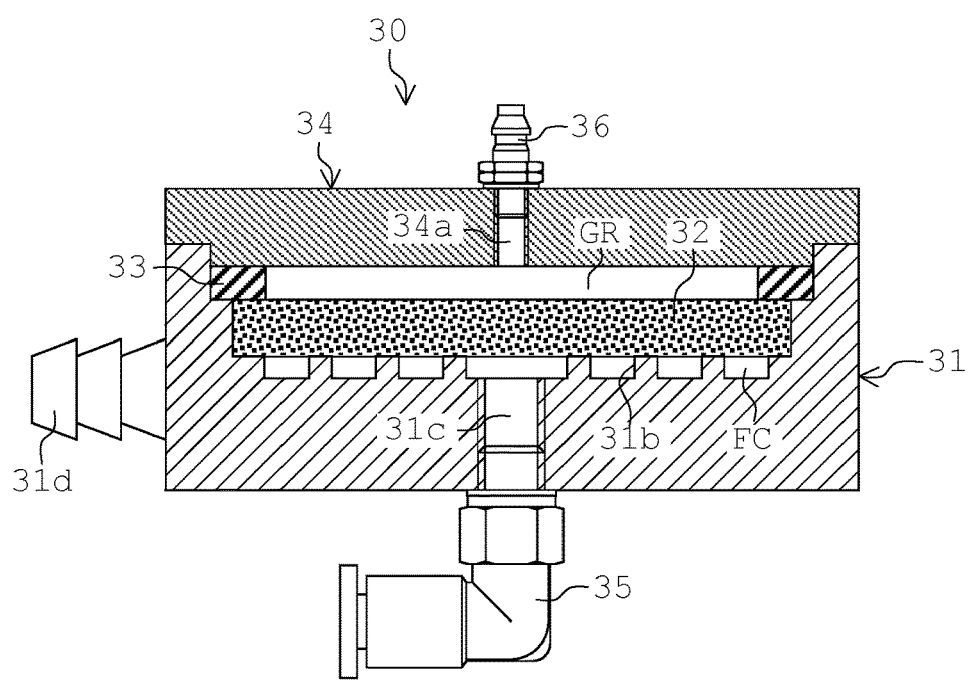
FIG. 4 is a cross-sectional view taken along a line X-X in FIG. 2.

Hereinafter, embodiments will be described with reference to the drawings. FIG. 1 illustrates a schematic configuration of a fine bubble generating apparatus according to the present invention. As shown in FIG. 1, a fine bubble generating apparatus 1 includes a storage tank 10 for storing liquid, a liquid feeding unit (relative movement unit) 20 for suctioning and feeding the liquid stored in the storage tank 10, a gas discharge unit 30 for discharging gas into the liquid which is being fed by the liquid feeding unit 20, and a storage tank 40 for storing the liquid into which the gas has been discharged by the gas discharge unit 30.

The liquid feeding unit 20 includes a liquid feeding pipe 21 and a liquid feeding pipe 22 that form a liquid flow channel, a variable-flow-rate-type liquid feeding pump 23 disposed in the liquid feeding pipe 22 portion, and a valve 24 disposed in the liquid feeding pipe 21 portion for adjusting a negative pressure level of the gas discharge unit 30, as shown in FIG. 1. Liquid stored in the storage tank 10 is fed into the storage tank 40 through the gas discharge unit 30.

Figure 5:
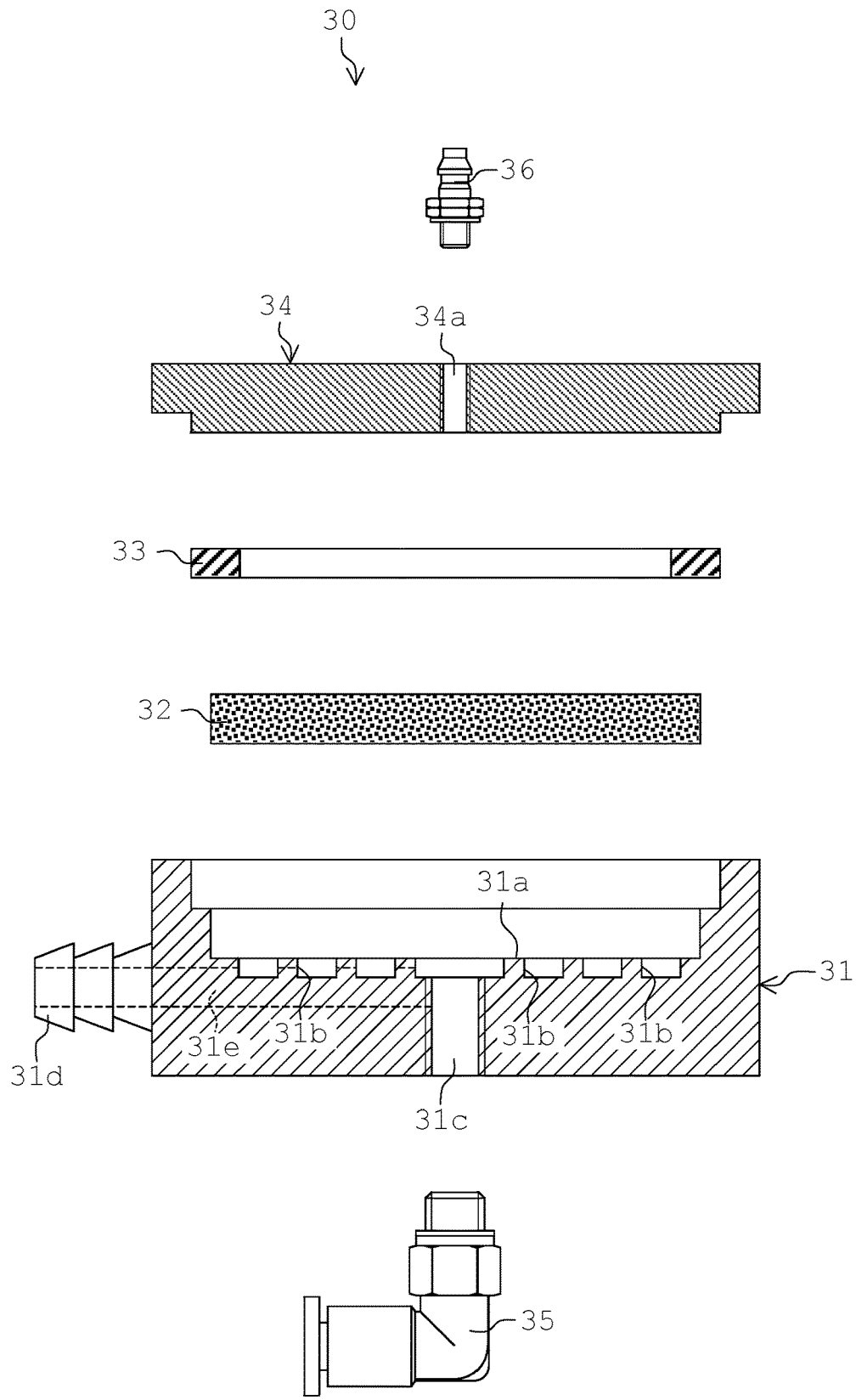
FIG. 5 is an exploded cross-sectional view of the gas discharge unit.
Figure 6:
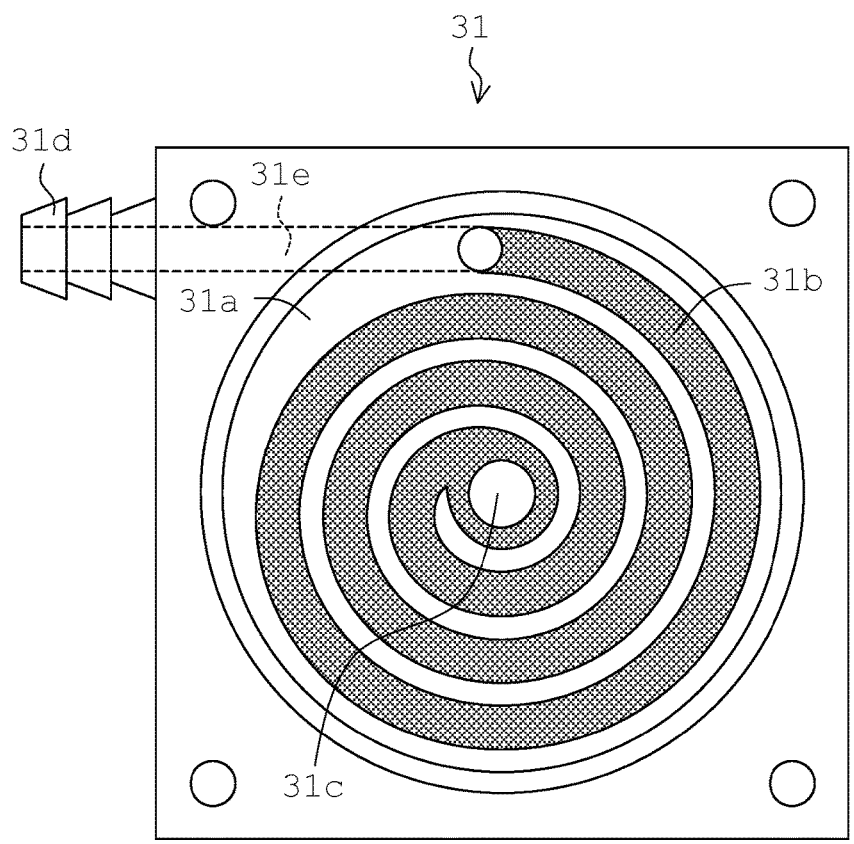
FIG. 6 is a plan view of a base member of the gas discharge unit.

The gas discharge unit 30 includes a base member (flow channel forming member) 31 that is a resin molded product and has a spiral groove 31b formed in a round recessed bottom surface 31a, a disk-shaped gas discharge member 32 disposed such that the lower surface (gas discharge surface) is in contact with the recessed bottom surface 31a of the base member 31, an annular packing 33 disposed in surface contact with the upper surface peripheral edge portion of the disk-shaped gas discharge member 32, and a round cap 34 that is a resin molded product and is fitted into the recess of the base member 31 so as to press the annular packing 33 downward, as shown in FIG. 1 to FIG. 6. A flow channel FC for liquid is formed by the spiral groove 31b and the lower surface (gas discharge surface) of the gas discharge member 32 in a state where liquid is in contact with the lower surface (gas discharge surface) of the gas discharge member 32. A gas supply chamber GR is formed by the annular packing 33 between the upper surface of the gas discharge member 32 and the lower surface of the cap 34. The hatched portion indicated in FIG. 6 represents the spiral groove 31b.

The base member 31 has a screw hole 31c that penetrates the end portion, on the center side, of the spiral groove 31b in the up-down direction, as shown in FIG. 5 and FIG. 6. The downstream-side end portion of the liquid feeding pipe 21 of the liquid feeding unit 20 is connected to the gas discharge unit 30 through a piping joint 35 screwed into the screw hole 31c.

On the side surface of the base member 31, a bamboo-shoot-shaped piping joint 31d to which the upstream-side end portion of the liquid feeding pipe 22 of the liquid feeding unit 20 is connected, is formed integrally with the side surface of the base member 31. Inside the base member 31, a flow channel 31e that connects between the piping joint 31d and the end portion, on the outer side, of the spiral groove 31b is formed.

Therefore, liquid stored in the storage tank 10 is fed through the liquid feeding pipe 21 of the liquid feeding unit 20 to the gas discharge unit 30, fed through the flow channel FC and the flow channel 31e of the base member 31 to the liquid feeding pipe 22 of the liquid feeding unit 20, and fed into the storage tank 40 through the liquid feeding pipe 22.

The gas discharge member 32 is formed from an air-permeable porous body made of porous ceramics such as a porous alumina material and porous glass, and multiple gas discharge pores having pore diameters (mode diameter) of 1.5 [μm] or less are opened in the lower surface. Specifically, the gas discharge members 32 that have gas discharge pores having six pore diameters (mode diameters) of 1.5 μm, 1 μm, 0.8 μm, 0.4 μm, 0.05 μm, and 0.005 μm, respectively, and that have two kinds of pore diameter distributions for each of the pore diameters, are used, so that 12 kinds of the gas discharge members 32 are used in total. The pore diameter distribution of the gas discharge pores is evaluated according to a value of (D90-D10)/D50 in which D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores. When the value is small, variation in pore diameter is small. When the value is great, variation in pore diameter is great. The pore diameters (mode diameter), and the values of D10, D50, and D90 of the gas discharge pores of each gas discharge member 32 are obtained as follows. That is, for a test piece (20 mm×5 mm) which is cut out from each gas discharge member 32, a pore diameter distribution is measured three times by a gas adsorption method by using a pore diameter distribution measuring device (for porous alumina material: Perm-Porometer manufactured by POROUS MATERIALS in the U.S.A., for porous glass: Nano-Perm-Porometer manufactured by Seika Digital Image CORPORATION), and a distribution table obtained by the obtained pore diameter distributions being averaged is used to obtain the pore diameters and the values of D10, D50, and D90.

The cap 34 has a screw hole 34a that penetrates through the center of the cap 34 in the up-down direction. A gas supply pipe for supplying various gases can be connected to the gas supply chamber GR through a piping joint 36 screwed into the screw hole 34a. In examples described below, air is used as gas. Therefore, the piping joint 36 is opened to the atmosphere without connecting to the gas supply pipe.

In the fine bubble generating apparatus 1 having the above-described configuration, when liquid is introduced into the storage tank 10 and the liquid feeding pump 23 is operated, the liquid in the storage tank 10 is fed through the flow channel FC of the gas discharge unit 30 to the storage tank 40. The pressure in the flow channel FC of the gas discharge unit 30 disposed on the suctioning side of the liquid feeding pump 23 is negative pressure, and air is suctioned into the liquid that passes through the flow channel FC, through the gas discharge pores opened in the lower surface of the gas discharge member 32, due to the negative pressure. When the pump flow rate is adjusted such that the liquid flow velocity in the flow channel FC of the gas discharge unit 30 is not less than 1 [m/sec], air suctioned into the liquid that passes through the flow channel FC, through the gas discharge pores of the gas discharge member 32, is divided into fine bubbles having sizes of 1.5 μm or less, by the liquid flow in the flow channel FC, and the fine bubbles slowly contract to generate nano-order fine bubbles, so that the liquid containing the nano-order fine bubbles is stored in the storage tank 40.

Hereinafter, examples 1 to 19 of the present invention and comparative examples 1 to 7 in which fine bubbles of air were generated in pure water by using the fine bubble generating apparatus 1 described above, will be described with reference to Table 1. However, needless to say, the present invention is not limited to the examples described below.

Example 1

As indicated in Table 1, as the gas discharge member 32 of the gas discharge unit 30, the gas discharge member 32 in which the gas discharge pores had pore diameters (mode diameter) of 1.5 μm and the pore diameter distribution (D90−D10)/D50 was 2.898, was used. Pure water was introduced into the storage tank 10, and the pump flow rate was adjusted such that the flow velocity in the flow channel FC of the gas discharge unit 30 was 2 [m/sec]. In this state, the liquid feeding pump 23 was operated to generate fine bubbles of air in the pure water.

Example 2

As indicated in Table 1, fine bubbles of air were generated in pure water in the same manner as in example 1 except that the gas discharge member 32 in which the gas discharge pores had the pore diameters (mode diameter) of 1 μm and the pore diameter distribution (D90−D10)/D50 was 2.591 was used as the gas discharge member 32 of the gas discharge unit 30.

Example 3

As indicated in Table 1, fine bubbles of air were generated in pure water in the same manner as in example 1 except that the gas discharge member 32 in which the gas discharge pores had the pore diameters (mode diameter) of 0.8 μm and the pore diameter distribution (D90−D10)/D50 was 2.268 was used as the gas discharge member 32 of the gas discharge unit 30.

Example 4

As indicated in Table 1, fine bubbles of air were generated in pure water in the same manner as in example 1 except that the gas discharge member 32 in which the gas discharge pores had the pore diameters (mode diameter) of 0.4 μm and the pore diameter distribution (D90−D10)/D50 was 1.553 was used as the gas discharge member 32 of the gas discharge unit 30.

Example 5

As indicated in Table 1, fine bubbles of air were generated in pure water in the same manner as in example 1 except that the gas discharge member 32 in which the gas discharge pores had the pore diameters (mode diameter) of 0.05 μm and the pore diameter distribution (D90−D10)/D50 was 1.206 was used as the gas discharge member 32 of the gas discharge unit 30.

Example 6

As indicated in Table 1, fine bubbles of air were generated in pure water in the same manner as in example 1 except that the gas discharge member 32 in which the gas discharge pores had the pore diameters (mode diameter) of 0.005 μm and the pore diameter distribution (D90−D10)/D50 was 1.025 was used as the gas discharge member 32 of the gas discharge unit 30.

Example 7

As indicated in Table 1, fine bubbles of air were generated in pure water in the same manner as in example 4 except that the pump flow rate was adjusted such that the flow velocity in the flow channel FC of the gas discharge unit 30 was 1 [m/sec].

Example 8

As indicated in Table 1, fine bubbles of air were generated in pure water in the same manner as in example 4 except that the pump flow rate was adjusted such that the flow velocity in the flow channel FC of the gas discharge unit 30 was 3 [m/sec].

Example 9

As indicated in Table 1, fine bubbles of air were generated in pure water in the same manner as in example 4 except that the pump flow rate was adjusted such that the flow velocity in the flow channel FC of the gas discharge unit 30 was 5 [m/sec].

Example 10

As indicated in Table 1, fine bubbles of air were generated in pure water in the same manner as in example 4 except that the pump flow rate was adjusted such that the flow velocity in the flow channel FC of the gas discharge unit 30 was 10 [m/sec].

Example 11

As indicated in Table 1, fine bubbles of air were generated in pure water in the same manner as in example 1 except that the gas discharge member 32 in which the gas discharge pores had the pore diameters (mode diameter) of 1.5 μm and the pore diameter distribution (D90−D10)/D50 was 8.474 was used as the gas discharge member 32 of the gas discharge unit 30.

Example 12

As indicated in Table 1, fine bubbles of air were generated in pure water in the same manner as in example 2 except that the gas discharge member 32 in which the gas discharge pores had the pore diameters (mode diameter) of 1 μm and the pore diameter distribution (D90−D10)/D50 was 9.611 was used as the gas discharge member 32 of the gas discharge unit 30.

Example 13

As indicated in Table 1, fine bubbles of air were generated in pure water in the same manner as in example 3 except that the gas discharge member 32 in which the gas discharge pores had the pore diameters (mode diameter) of 0.8 μm and the pore diameter distribution (D90−D10)/D50 was 4.893 was used as the gas discharge member 32 of the gas discharge unit 30.

Example 14

As indicated in Table 1, fine bubbles of air were generated in pure water in the same manner as in example 4 except that the gas discharge member 32 in which the gas discharge pores had the pore diameters (mode diameter) of 0.4 μm and the pore diameter distribution (D90−D10)/D50 was 7.474 was used as the gas discharge member 32 of the gas discharge unit 30.

Example 15

As indicated in Table 1, fine bubbles of air were generated in pure water in the same manner as in example 5 except that the gas discharge member 32 in which the gas discharge pores had the pore diameters (mode diameter) of 0.05 μm and the pore diameter distribution (D90−D10)/D50 was 3.980 was used as the gas discharge member 32 of the gas discharge unit 30.

Example 16

As indicated in Table 1, fine bubbles of air were generated in pure water in the same manner as in example 7 except that the gas discharge member 32 in which the gas discharge pores had the pore diameters (mode diameter) of 0.4 μm and the pore diameter distribution (D90−D10)/D50 was 7.474 was used as the gas discharge member 32 of the gas discharge unit 30.

Example 17

As indicated in Table 1, fine bubbles of air were generated in pure water in the same manner as in example 8 except that the gas discharge member 32 in which the gas discharge pores had the pore diameters (mode diameter) of 0.4 μm and the pore diameter distribution (D90−D10)/D50 was 7.474 was used as the gas discharge member 32 of the gas discharge unit 30.

Example 18

As indicated in Table 1, fine bubbles of air were generated in pure water in the same manner as in example 9 except that the gas discharge member 32 in which the gas discharge pores had the pore diameters (mode diameter) of 0.4 μm and the pore diameter distribution (D90−D10)/D50 was 7.474 was used as the gas discharge member 32 of the gas discharge unit 30.

Example 19

As indicated in Table 1, fine bubbles of air were generated in pure water in the same manner as in example 10 except that the gas discharge member 32 in which the gas discharge pores had the pore diameters (mode diameter) of 0.4 μm and the pore diameter distribution (D90−D10)/D50 was 7.474 was used as the gas discharge member 32 of the gas discharge unit 30.

Comparative Example 1

As indicated in Table 1, as the gas discharge member 32 of the gas discharge unit 30, the gas discharge member 32 in which the gas discharge pores had the pore diameters (mode diameter) of 2 μm, and the pore diameter distribution (D90−D10)/D50 was 2.734, was used. Pure water was introduced into the storage tank 10, and the pump flow rate was adjusted such that the flow velocity in the flow channel FC of the gas discharge unit 30 was 5 [m/sec]. In this state, the liquid feeding pump 23 was operated to generate fine bubbles of air in the pure water.

Comparative Example 2

As indicated in Table 1, fine bubbles of air were generated in pure water in the same manner as in comparative example 1 except that the gas discharge member 32 in which the gas discharge pores had the pore diameters (mode diameter) of 2.5 μm and the pore diameter distribution (D90−D10)/D50 was 2.649 was used as the gas discharge member 32 of the gas discharge unit 30.

Comparative Example 3

As indicated in Table 1, fine bubbles of air were generated in pure water in the same manner as in comparative example 1 except that the gas discharge member 32 in which the gas discharge pores had the pore diameters (mode diameter) of 5 μm and the pore diameter distribution (D90−D10)/D50 was 2.981 was used as the gas discharge member 32 of the gas discharge unit 30.

Comparative Example 4

As indicated in Table 1, fine bubbles of air were generated in pure water in the same manner as in example 4 except that the pump flow rate was adjusted such that the flow velocity in the flow channel FC of the gas discharge unit 30 was 0.8 [m/sec].

Comparative Example 5

As indicated in Table 1, fine bubbles of air were generated in pure water in the same manner as in example 4 except that the pump flow rate was adjusted such that the flow velocity in the flow channel FC of the gas discharge unit 30 was 0.5 [m/sec].

Comparative Example 6

As indicated in Table 1, fine bubbles of air were generated in pure water in the same manner as in example 4 except that the pump flow rate was adjusted such that the flow velocity in the flow channel FC of the gas discharge unit 30 was 0.3 [m/sec].

Comparative Example 7

As indicated in Table 1, fine bubbles of air were generated in pure water in the same manner as in example 4 except that the pump flow rate was adjusted such that the flow velocity in the flow channel FC of the gas discharge unit 30 was 0.1 [m/sec].

The water generated according to examples 1 to 19 and comparative examples 1 to 7 described above was left as it was for 15 minutes, and was thereafter stirred slightly by a stirring rod. The mode diameter, D90, D50, and D10, and the number of bubbles contained in the generated water in each example were measured five times by using a nanoparticle analyzing system (NanoSight LM10 manufactured by Malvern), and the average values are indicated in Table 1.

TABLE 1

| | Gas discharge pore | | | Generated bubble | | |
|---|---|---|---|---|---|---|
| | Pore diameter (mode diameter) [mµ] | Pore diameter distribution (D90-D10)/D50 [—] | Liquid flow velocity [m/s] | Bubble diameter (mode diameter) [nm] | Bubble diameter distribution (D90-D10)/D50 [—] | The number of bubbles [bubbles/ml] |
| Example 1 | 1.5 | 2.898 | 2.0 | 121.3 | 1.973 | 140000000 (1.4 × $10^8$) |
| Example 2 | 1 | 2.591 | 2.0 | 145.9 | 1.425 | 190000000 (1.9 × $10^8$) |
| Example 3 | 0.8 | 2.268 | 2.0 | 108.6 | 1.355 | 340000000 (3.4 × $10^8$) |
| Example 4 | 0.4 | 1.553 | 2.0 | 102.0 | 1.095 | 840000000 (8.4 × $10^8$) |
| Example 5 | 0.05 | 1.206 | 2.0 | 98.9 | 0.825 | 690000000 (6.9 × $10^8$) |
| Example 6 | 0.005 | 1.025 | 2.0 | 95.8 | 0.748 | 540000000 (5.4 × $10^8$) |
| Example 7 | 0.4 | 1.553 | 1.0 | 105.3 | 0.928 | 610000000 (6.1 × $10^8$) |
| Example 8 | 0.4 | 1.553 | 3.0 | 100.6 | 1.085 | 720000000 (7.2 × $10^8$) |
| Example 9 | 0.4 | 1.553 | 5.0 | 112.3 | 0.968 | 790000000 (7.9 × $10^8$) |
| Example 10 | 0.4 | 1.553 | 10.0 | 98.4 | 0.882 | 930000000 (9.3 × $10^8$) |
| Example 11 | 1.5 | 8.474 | 2.0 | 162.9 | 6.283 | 790000 (7.9 × $10^5$) |
| Example 12 | 1 | 9.611 | 2.0 | 168.8 | 6.201 | 1000000 (1.0 × $10^6$) |
| Example 13 | 0.8 | 4.893 | 2.0 | 117.0 | 3.101 | 1100000 (1.1 × $10^5$) |
| Example 14 | 0.4 | 7.474 | 2.0 | 120.8 | 5.541 | 2600000 (2.6 × $10^6$) |
| Example 15 | 0.05 | 3.980 | 2.0 | 128.9 | 3.031 | 2100000 (2.1 × $10^6$) |
| Example 16 | 0.4 | 7.474 | 1.0 | 119.2 | 5.281 | 350000 (3.5 × $10^5$) |
| Example 17 | 0.4 | 7.474 | 3.0 | 149.4 | 9.857 | 2100000 (2.1 × $10^6$) |
| Example 18 | 0.4 | 7.474 | 5.0 | 113.1 | 11.777 | 18000000 (1.8 × $10^7$) |
| Example 19 | 0.4 | 7.474 | 10.0 | 102.9 | 13.408 | 230000000 (2.3 × $10^8$) |
| Comp. Ex. 1 | 2 | 2.734 | 5.0 | 178.6 | 2.269 | 20000 (2.0 × $10^4$) |
| Comp. Ex. 2 | 2.5 | 2.649 | 5.0 | 159.3 | 2.925 | 5200 (5.2 × $10^3$) |
| Comp. Ex. 3 | 5 | 2.981 | 5.0 | 183.2 | 3.866 | 840 (8.4 × $10^2$) |
| Comp. Ex. 4 | 0.4 | 1.553 | 0.8 | 93.6 | 1.036 | 24000 (2.4 × $10^4$) |
| Comp. Ex. 5 | 0.4 | 1.553 | 0.5 | 95.4 | 1.165 | 5400 (5.4 × $10^3$) |
| Comp. Ex. 6 | 0.4 | 1.553 | 0.3 | 102.6 | 1.957 | 340 (3.4 × $10^2$) |
| Comp. Ex. 7 | 0.4 | 1.553 | 0.1 | 178.9 | 3.254 | 150 (1.5 × $10^2$) |

According to Table 1, it was confirmed that, in the water generated according to examples 1 to 10 configured such that the gas discharge member 32 in which the gas discharge pores had pore diameters (mode diameter) of 1.5 µm or less and variation in the pore diameter distribution was small ((D90−D10)/D50≤3), was used and the pump flow rate was adjusted such that the flow velocity in the flow channel FC of the gas discharge unit 30 was not less than 1 [m/sec], a large number of fine bubbles in which the bubble diameters (mode diameter) were around 100 nm and variation in bubble diameter distribution was small ((D90−D10)/D50≤3) were generated at the order of $10^8$ bubbles.

In examples 11 to 19 configured such that the gas discharge member 32 in which the gas discharge pores had pore diameters (mode diameter) of 1.5 µm or less but variation in the pore diameter distribution was great ((D90−D10)/D50>3), was used and the pump flow rate was adjusted such that the flow velocity in the flow channel FC of the gas discharge unit 30 was not less than 1 [m/sec], it was indicated that fine bubbles, in which the bubble diameters (mode diameter) were about 100 nm to about 170 nm and variation in the bubble diameter distribution was great ((D90−D10)/D50>3), were generated at the order of $10^5$ to $10^8$ bubbles, the generated fine bubbles had a wide range of bubble diameters (mode diameter), variation in bubble diameter distribution was great, and the number of generated fine bubbles was small, as compared with examples 1 to 10.

Meanwhile, in comparative examples 1 to 3 using the gas discharge member 32 in which the gas discharge pores had pore diameters (mode diameter) exceeding 1.5 µm, it was confirmed that, even when the flow velocity in the flow channel FC of the gas discharge unit 30 was 5 [m/sec] that was much greater than 1 [m/sec], the generated fine bubbles had relatively large bubble diameters (mode diameter) of about 160 nm to about 180 nm, and the fine bubbles were generated at the order of $10^2$ to $10^4$ bubbles and the number of generated fine bubbles was extremely small.

In comparative examples 4 to 7 in which, although the gas discharge pores had the pore diameters (mode diameter) of 0.4 µm that was much less than 1.5 µm, the flow velocity in the flow channel FC of the gas discharge unit 30 was less than 1 [m/sec], it was confirmed that the generated fine bubbles had a wide range of bubble diameters (mode diameter) of about 90 nm to about 180 nm, and the fine bubbles were generated at the order of $10^2$ to $10^4$ bubbles and the number of the generated fine bubbles was extremely small.

According to the above-described results, in order to generate fine bubbles having bubble diameters (mode diameter) of about 100 nm to about 170 nm at the order of $10^5$ bubbles or more, the gas discharge member 32 in which the gas discharge pores have pore diameters (mode diameter) of 1.5 µm or less needs to be used, and the flow velocity in the flow channel FC of the gas discharge unit 30 needs to be adjusted so as to be not less than 1 [m/sec]. Furthermore, in order to generate a large number of fine bubbles in which the bubble diameters (mode diameter) are around 100 nm and variation in bubble diameter distribution is small ((D90−D10)/D50≤3), at the order of $10^8$ bubbles, the pore diameter distribution (D90−D10)/D50 of the gas discharge pores of the gas discharge member 32 to be used needs to be reduced to be not greater than 3.

Figure 7:
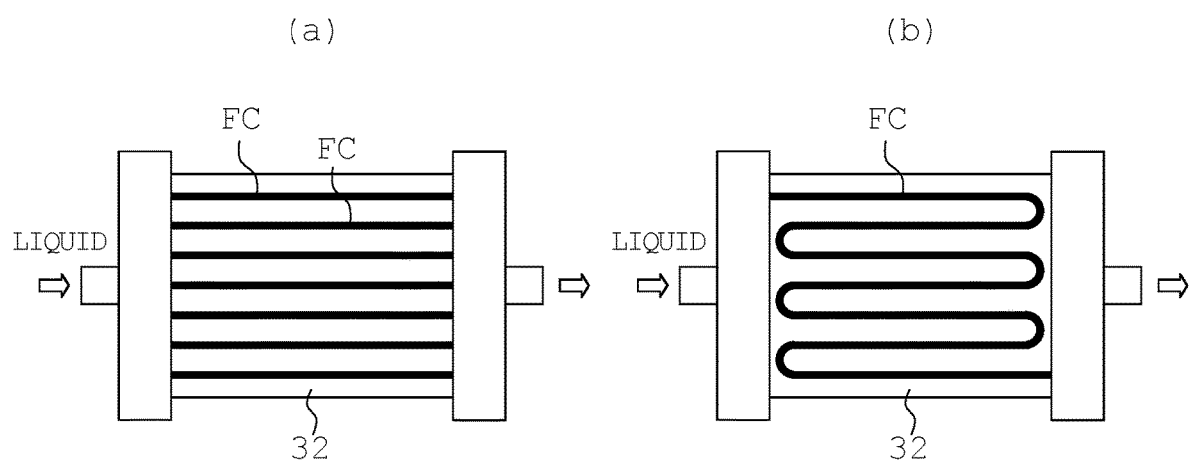
FIGS. 7 (*a*) and (*b*) are each a schematic diagram illustrating a modified pattern of a flow channel disposed on a gas discharge surface of a gas discharge member of the gas discharge unit.

In the above-described embodiment, the spiral flow channel FC is disposed on the gas discharge surface in order to move liquid along the gas discharge surface (lower surface) of the gas discharge member 32. However, the present invention is not limited thereto. For example, as shown in FIG. 7(a), a plurality of linear flow channels FC may be longitudinally or transversely aligned on the gas discharge surface, or, as shown in FIG. 7(b), a single flow channel FC may be formed so as to alternately invert its direction at both ends on the gas discharge surface.

Figure 8:
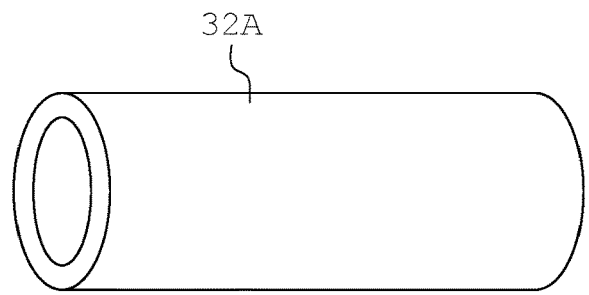
FIG. 8 is a perspective view of a gas discharge member according to a modification.
Figure 9:
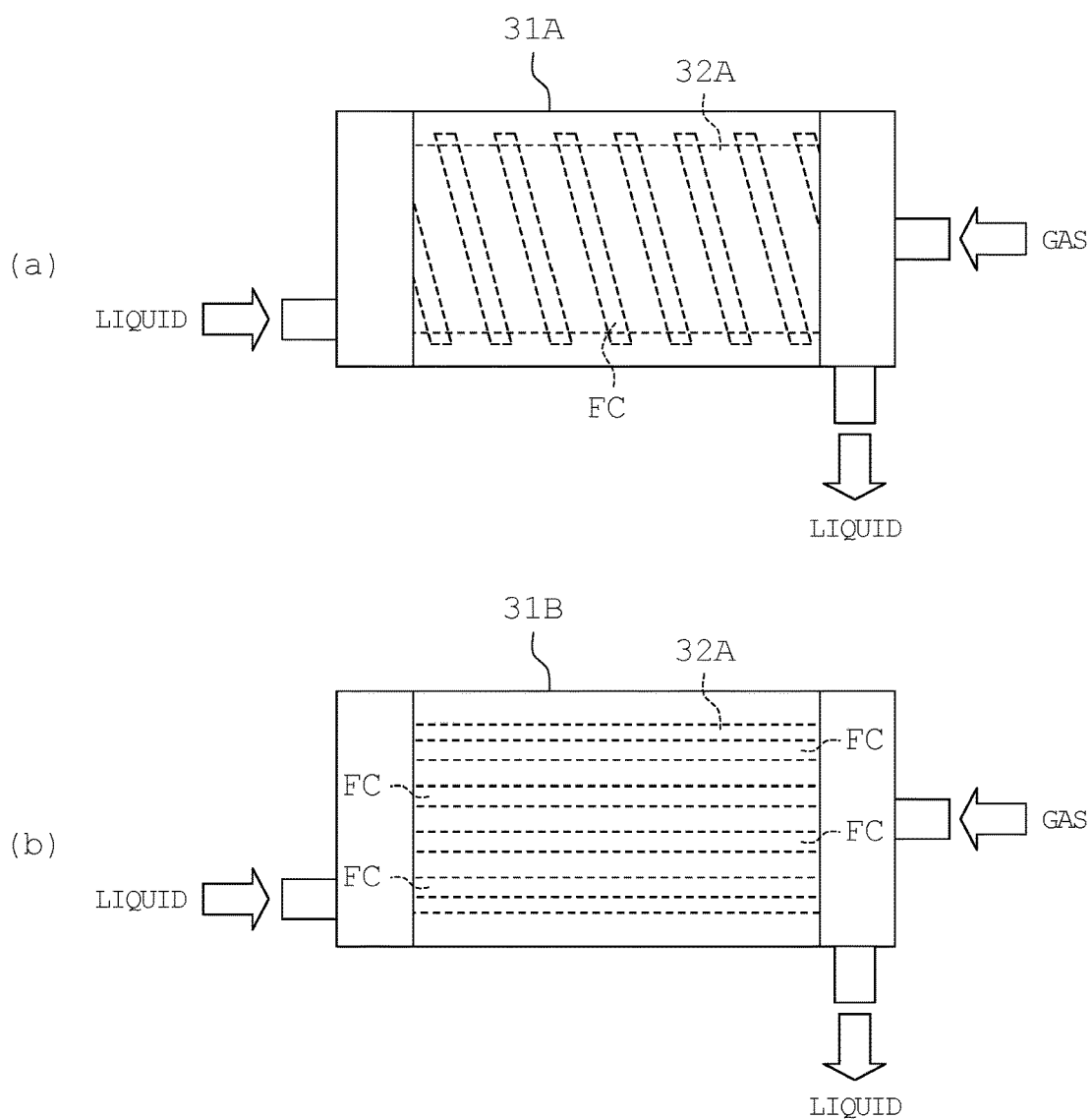
FIGS. 9 (*a*) and (*b*) are each a schematic diagram illustrating a gas discharge unit using a cylindrical gas discharge member according to a modification.
Figure 10:
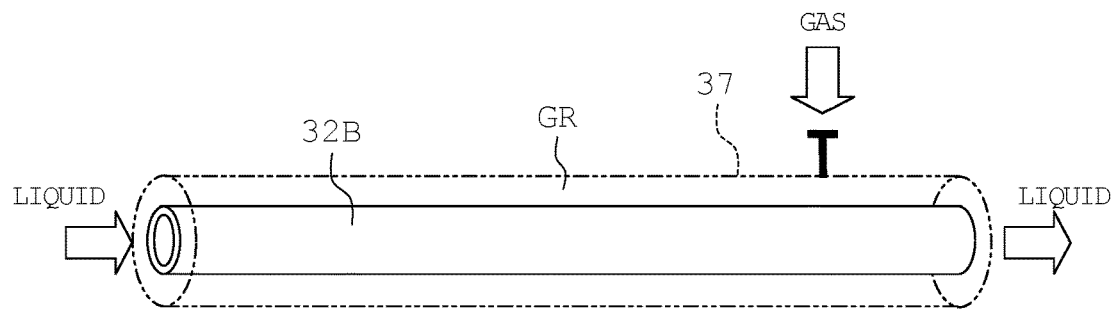
FIG. 10 is a schematic diagram illustrating a gas discharge unit using a cylindrical gas discharge member according to another modification.

In the above-described embodiment, the disk-shaped gas discharge member 32 is used. However, the present invention is not limited thereto. For example, as shown in FIG. 8, a cylindrical gas discharge member 32A may be used. When such a cylindrical gas discharge member 32A is used, a cylindrical flow channel forming member 31A, 31B in which both end portions are closed to form a hollow portion as a gas supply chamber into which gas is introduced, and a single helical groove (see FIG. 9(a)) or a plurality of liner grooves (see FIG. 9(b)) that extend in the axial direction are formed in the inner circumferential surface, may be attached so as to contact with the outer circumferential surface of the gas discharge member 32A having the cylindrical inner circumferential surface, to form the flow channel FC for liquid by the helical groove or the liner grooves and the outer circumferential surface of the gas discharge member 32A, as shown in FIGS. 9 (a) and (b). Meanwhile, as shown in FIG. 10, a hollow portion of a cylindrical gas discharge member 32B may be used as a liquid flow channel and the outer circumferential portion of the gas discharge member 32B may be covered by a cylindrical body 37 indicated by the alternate long and two short dashes line in FIG. 10 to form the gas supply chamber GR into which gas is introduced, on the outer circumferential surface side of the gas discharge member 32B.

Figure 11:
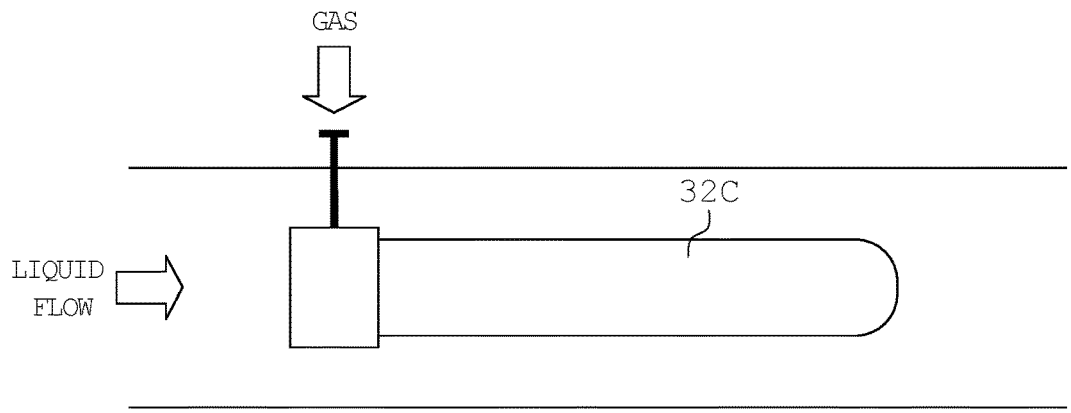
FIG. 11 is a schematic diagram illustrating a fine bubble generator of a fine bubble generating apparatus according to another embodiment.
Figure 12:
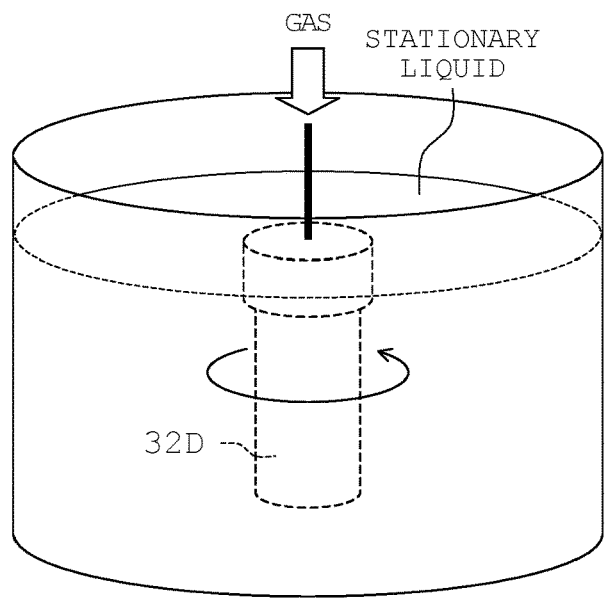
FIG. 12 is a schematic diagram illustrating a configuration of a fine bubble generating apparatus according to another embodiment.

In the embodiments described above, the flow channel forming member 31, 31A, 31B is attached to the lower surface of the disk-shaped gas discharge member 32 or the outer circumferential surface of the cylindrical gas discharge member 32A to form the flow channel FC for liquid, or the hollow portion of the cylindrical gas discharge member 32B is used as the flow channel for liquid. However, the present invention is not limited thereto. For example, as shown in FIG. 11, a gas discharge member 32C in which the outer surface serves as the gas discharge surface may be disposed in a liquid flow to move the liquid along the outer surface (gas discharge surface) of the gas discharge member 32C, or, as shown in FIG. 12, a columnar or cylindrical gas discharge member 32D in which the outer circumferential surface serves as the gas discharge surface may be immersed in stationary liquid and rotated at a fixed position around the axis in the immersed state to relatively move the liquid along the outer circumferential surface (gas discharge surface) of the gas discharge member 32D.

Figure 13:
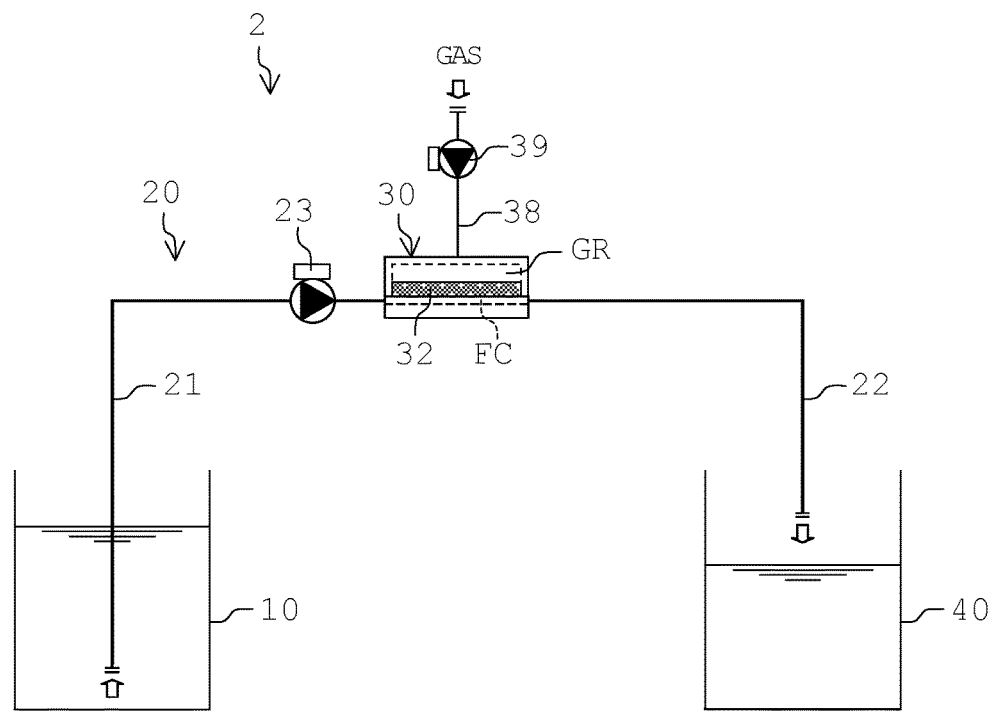
FIG. 13 is a schematic diagram illustrating a configuration of a fine bubble generating apparatus according to another embodiment.

In each embodiment described above, the gas discharge unit 30 is disposed on the suctioning side of the liquid feeding pump 23. However, the present invention is not limited thereto. For example, as in a fine bubble generating apparatus 2 shown in FIG. 13, the gas discharge unit 30 may be disposed on the discharge side of the liquid feeding pump 23. However, in this case, when the liquid feeding pump 23 is operated, the pressure in the flow channel FC of the gas discharge unit 30 is positive pressure. Therefore, a gas supply pipe 38 needs to be connected to the piping joint 36 of the gas discharge unit 30, and a gas supply pump 39 needs to be disposed in the gas supply pipe 38 to push out gas into liquid flowing in the flow channel FC, from the gas discharge surface of the gas discharge member 32, by the discharge pressure of the gas supply pump 39.

Figure 14:
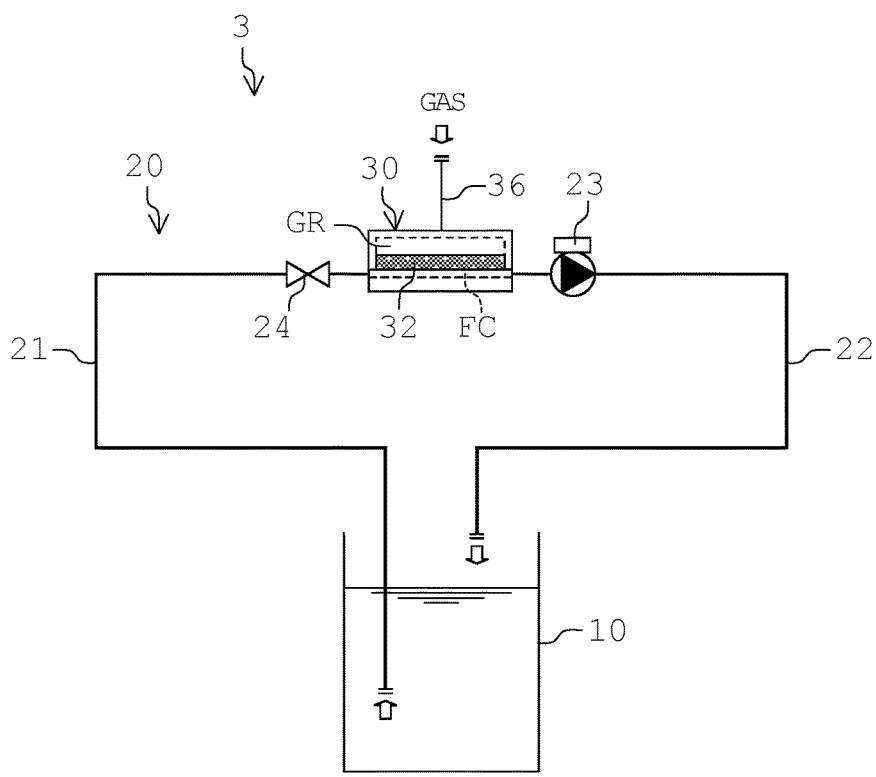
FIG. 14 is a schematic diagram illustrating a configuration of a fine bubble generating apparatus according to another embodiment.

In each embodiment described above, liquid in the storage tank 10 is fed to the storage tank 40 through the flow channel FC of the gas discharge unit 30. However, the present invention is not limited thereto. For example, as in a fine bubble generating apparatus 3 shown in FIG. 14, liquid in the storage tank 10 may be fed back into the storage tank 10 through the flow channel FC of the gas discharge unit 30.

INDUSTRIAL APPLICABILITY

The fine bubble generating method and the fine bubble generating apparatus according to the present invention can efficiently generate nano-order fine bubbles of various gases in various liquids, and can thus be used in various fields such as treatment of wastes from plants, cleaning, sterilization, disinfection, maintenance of freshness of perishable products, aquaculture, and the like, by selecting the liquid and the gas to be contained as fine bubbles in the liquid as appropriate.

DESCRIPTION OF THE REFERENCE CHARACTERS 1, 2, 3 fine bubble generating apparatus
10, 40 storage tank
20 liquid feeding unit (relative movement unit)
21, 22 liquid feeding pipe
23 liquid feeding pump
24 valve
30 gas discharge unit
31 base member (flow channel forming member)
31A, 31B flow channel forming member
31a recessed bottom surface
31b groove
31c screw hole
31d piping joint
31e flow channel
32, 32A, 32B, 32C, 32D gas discharge member
33 packing
34 cap
34a screw hole
35, 36 piping joint
37 cylindrical body
38 gas supply pipe
39 gas supply pump
FC flow channel
GR gas supply chamber

The invention claimed is:
1. A fine bubble generating method for generating, in liquid, fine bubbles having nano-order diameters, the fine bubble generating method comprising:
bringing liquid into contact with a gas discharge surface of a gas discharge member located within a gas discharge unit, the gas discharge member having multiple gas discharge pores having pore diameters of 1.5 μm or less that are opened, and
discharging gas into the liquid from the gas discharge member while the liquid is relatively moved along the gas discharge surface of the gas discharge member such that a velocity relative to the gas discharge member is not less than 1 m/sec, wherein:
the gas discharge unit includes a flow channel forming member that has a groove formed in a surface on which the flow channel forming member contacts with the gas discharge surface of the gas discharge member and that is attached so as to be in surface contact with the gas discharge surface of the gas discharge member, and
a relative movement unit moves the liquid along the gas discharge surface of the gas discharge member by causing the liquid to flow in a flow channel enclosed by the gas discharge surface of the gas discharge member and the groove of the flow channel forming member.

2. The fine bubble generating method according to claim 1, wherein a pore diameter distribution of the gas discharge pores satisfies (D90−D10)/D50≤3.0 where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

3. The fine bubble generating method according to claim 1, wherein the gas discharge member is disposed in a flow of the liquid to move the liquid along the gas discharge surface of the gas discharge member.

4. The fine bubble generating method according to claim 1, wherein the flow channel for the liquid is disposed on the gas discharge surface of the gas discharge member in a state where the liquid is in contact with the gas discharge surface, and the liquid is caused to flow in the flow channel and the liquid is thus moved along the gas discharge surface of the gas discharge member.

5. The fine bubble generating method according to claim 2, wherein the gas discharge member is disposed in a flow of the liquid to move the liquid along the gas discharge surface of the gas discharge member.

6. The fine bubble generating method according to claim 2, wherein the flow channel for the liquid is disposed on the gas discharge surface of the gas discharge member in a state where the liquid is in contact with the gas discharge surface, and the liquid is caused to flow in the flow channel and the liquid is thus moved along the gas discharge surface of the gas discharge member.

7. A fine bubble generating apparatus for generating, in liquid, fine bubbles having nano-order diameters, the fine bubble generating apparatus comprising:
 a gas discharge unit having a gas discharge member in which multiple gas discharge pores are opened in a gas discharge surface, and
 a relative movement unit configured to relatively move liquid along the gas discharge surface of the gas discharge member, wherein:
  the gas discharge member has the gas discharge pores having pore diameters of 1.5 μm or less,
  gas is discharged into the liquid from the gas discharge member while the liquid is relatively moved along the gas discharge surface of the gas discharge member by the relative movement unit such that a velocity relative to the gas discharge member is not less than 1 m/sec,
  the gas discharge unit includes a flow channel forming member that has a groove formed in a surface on which the flow channel forming member contacts with the gas discharge surface of the gas discharge member and that is attached so as to be in surface contact with the gas discharge surface of the gas discharge member, and
  the relative movement unit moves the liquid along the gas discharge surface of the gas discharge member by causing the liquid to flow in a flow channel enclosed by the gas discharge surface of the gas discharge member and the groove of the flow channel forming member.

8. The fine bubble generating apparatus according to claim 7, wherein a pore diameter distribution of the gas discharge pores satisfies (D90−D10)/D50≤3.0 where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

9. A fine bubble generating method for generating, in liquid, fine bubbles having nano-order diameters, the fine bubble generating method comprising:
 bringing liquid into contact with a gas discharge surface of a gas discharge member in which multiple gas discharge pores having pore diameters of 1.5 μm or less are opened, and
 discharging gas into the liquid from the gas discharge member while the liquid is relatively moved along the gas discharge surface of the gas discharge member such that a velocity relative to the gas discharge member is not less than 1 m/sec,
 wherein a spiral flow channel for the liquid is disposed on the gas discharge surface of the gas discharge member in a state where the liquid flows along a spiral path while in contact with the gas discharge surface, and the liquid is caused to flow along the spiral path in the flow channel and the liquid is thus moved along the gas discharge surface of the gas discharge member.

10. The fine bubble generating method according to claim 9, wherein a pore diameter distribution of the gas discharge pores satisfies (D90−D10)/D50≤3.0 where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

11. A fine bubble generating apparatus for generating, in liquid, fine bubbles having nano-order diameters, the fine bubble generating apparatus comprising:
 a gas discharge unit having a gas discharge member in which multiple gas discharge pores are opened in a gas discharge surface, and
 a relative movement unit configured to relatively move liquid along the gas discharge surface of the gas discharge member, wherein
  the gas discharge member has the gas discharge pores having pore diameters of 1.5 μm or less,
  the gas discharge unit and the relative movement unit are configured such that gas is discharged into the liquid from the gas discharge member while the liquid is relatively moved along the gas discharge surface of the gas discharge member by the relative movement unit such that a velocity relative to the gas discharge member is not less than 1 m/sec, and
  a spiral flow channel for the liquid is disposed on the gas discharge surface of the gas discharge member in a state where the liquid flows along a spiral path while in contact with the gas discharge surface, and the liquid is caused to flow along the spiral path in the flow channel and the liquid is thus moved along the gas discharge surface of the gas discharge member.

12. The fine bubble generating apparatus according to claim 11, wherein a pore diameter distribution of the gas discharge pores satisfies (D90−D10)/D50≤3.0 where D10 represents a pore diameter with which a cumulative number of pores counted from a small diameter side corresponds to 10% of a total number of pores, D50 represents a pore diameter with which a cumulative number of pores counted from the small diameter side corresponds to 50% of the total number of pores, and D90 represents a pore diameter with which a cumulative number of pores counted from the small diameter side corresponds to 90% of the total number of pores.

13. The fine bubble generating apparatus according to claim 11, wherein
- the gas discharge unit includes a flow channel forming member that has a groove formed in a surface on which the flow channel forming member contacts with the gas discharge surface of the gas discharge member and that is attached so as to be in surface contact with the gas discharge surface of the gas discharge member, and
- the relative movement unit moves the liquid along the gas discharge surface of the gas discharge member by causing the liquid to flow in the spiral flow channel enclosed by the gas discharge surface of the gas discharge member and the groove of the flow channel forming member.

\* \* \* \* \*